(12) United States Patent
Kohiyama et al.

(10) Patent No.: US 6,658,154 B2
(45) Date of Patent: *Dec. 2, 2003

(54) METHOD AND DEVICE FOR DECODING MOVING PICTURE

(75) Inventors: Kiyoshi Kohiyama, Kawasaki (JP); Yukio Otobe, Kawasaki (JP); Hidenaga Takahashi, Kawasaki (JP); Koji Yoshitomi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,865

(22) Filed: Aug. 3, 1999

(65) Prior Publication Data

US 2003/0169929 A1 Sep. 11, 2003

(30) Foreign Application Priority Data

Aug. 7, 1998 (JP) .......................................... 10-223514

(51) Int. Cl.⁷ ................................................ G06K 9/46
(52) U.S. Cl. ...................... 382/233; 382/107; 382/235; 382/236; 382/244; 375/240.01; 375/240.16
(58) Field of Search ................................ 382/233, 235, 382/236, 246, 250, 107, 234, 238, 239, 244, 245, 248, 251, 253; 345/532, 534, 535, 536, 537, 545, 547; 348/394.1, 398.1, 407.1, 409.1, 413.1; 375/240.01, 240.16, 240.24

(56) References Cited

U.S. PATENT DOCUMENTS

| | | | | |
|---|---|---|---|---|
| 5,274,443 A | * | 12/1993 | Dachiku et al. | 358/136 |
| 5,589,885 A | * | 12/1996 | Ooi | 348/416 |
| 5,754,234 A | * | 5/1998 | Kitsuki et al. | 348/394 |
| 5,790,745 A | * | 8/1998 | Sugiyama et al. | 386/111 |
| 6,006,005 A | * | 12/1999 | Okitsu | 386/232 |
| 6,088,047 A | * | 7/2000 | Bose et al. | 345/517 |
| 6,104,751 A | * | 8/2000 | Artieri | 375/240 |
| 6,219,381 B1 | * | 4/2001 | Sawada et al. | 375/240.14 |
| 6,459,736 B1 | * | 10/2002 | Ohta et al. | 375/240.25 |

* cited by examiner

*Primary Examiner*—Bhavesh M. Mehta
*Assistant Examiner*—Yosef Kassa
(74) *Attorney, Agent, or Firm*—Staas & Halsey LLP

(57) ABSTRACT

A memory control part 12 cyclically assigns time slots to buffer memory parts 21 to 25 respectively and in each time slot, controls access between the corresponding buffer memory part and a synchronous RAM 11. A time slot is determined while assuming the worst case where access to the synchronous RAM is the severest. Time slot groups of [(the number of pixels on one horizontal scanning line)/256] in number are generated in an imaginary one horizontal scanning period, where [ ] denotes an integer portion of the number in the parentheses. For a buffer memory 22 whose data volume changes depending on a compression factor, a time slot ending point may be made variable, or a time slot may be generated by interrupt as an exception.

28 Claims, 13 Drawing Sheets

FIG.8

CNTH

| Range | Period |
|---|---|
| 1 – 225 | TOP FIELD DECODING PERIOD (A) |
| 226 – 239 | SURPLUS PERIOD (B) |
| 240 – 262 | VERTICAL BLANKING PERIOD (C) |
| 263 – 487 | BOTTOM FIELD DECODING PERIOD (A) |
| 489 – 502 | SURPLUS PERIOD (B) |
| 503 – 525 | VERTICAL BLANKING PERIOD (C) |

METHOD AND DEVICE FOR DECODING MOVING PICTURE

BACKGROUND OF THE INVENTION

1. Field of the Invention

The present invention relates to a method of and a device for decoding a moving picture.

2. Description of the Related Art

In a device for decoding a moving picture, in order to simplify the structure, a plurality of processing parts are connected to one memory bus and a memory is connected to the memory bus by way of a memory control part. In the memory, coded image data, decoded image data, user data and audio data are stored. As a memory, while an ordinary DRAM may be employed, a synchronous DRAM such as a Rambus DRAM is usually employed in order to enable a higher speed access.

In a device for decoding a moving picture, it is only required that decoding processing of one frame is performed in a frame period, for example, 1/30 sec of a coded video signal.

However, since a compression factor of coded data and a predictive method are different according to a picture, a coded data volume and a processing time for decoding the data are also different according to a picture.

Therefore, small buffer memories are respectively equipped to the plurality of processing parts and arbitration among bus rights is performed in the memory control part on accepting interrupt requests from the processing parts.

However, since a coded data volume and a processing time for decoding the data are different according to a picture, interrupt requests become competitive, so that a memory access efficiency is deteriorated owing to a synchronous DRAM being used in a random access manner. Hence, there arises a necessity to raise an overall performance of a hard ware, which becomes a cause for cost increase.

Further, although a simulation is generally performed in LSI design in order to shorten a development time, it is hard to specify in what conditions a memory access request of the worst case will occur, which allows only a simulation in the assumable worst case. In addition, there arises a case where it takes several days to perform a design simulation on a bit stream for seconds.

Therefore, operation of an LSI is currently guaranteed, after an LSI is designed and fabricated, by executing a test on an actual product while inputting much bit streams thereto.

However, it is still unknown whether or not operation in the worst case is really guaranteed. Further, when desired operation of the LSI is not guaranteed in a test on an actual product, the design of the LSI has to be changed, and similar processing must be repeated. Therefore, a development time for the LSI is forced to be longer. In order to avoid such an inconvenience, to fabricate an LSI with a higher performance than necessary causes a cost rise.

SUMMARY OF THE INVENTION

Accordingly, it is an object to provide a method and device for decoding a moving picture which are good in access efficiency to a RAM.

It is another object to provide a method and device for decoding a moving picture for which a design to meet required specifications is easy to be achieved.

In the 1st aspect of the present invention, there is provided a device for decoding a moving picture wherein a plurality of buffer memory parts are connected between a plurality of respective processing parts and a memory bus and a RAM is connected through a memory control part to the memory bus, wherein the memory control part assigns time slots to the respective buffer memory parts cyclically and in each time slot, the memory control part controls access between the corresponding buffer memory part and the RAM.

Although an SRAM may be employed as a RAM, since a relative large capacity is needed, a DRAM which is high in storage density and low in cost is practical. Further, with an ordinary DRAM in use, a higher speed access is made possible than in a random access by changing a column address in a sequential manner while designating a raw address as in a page mode (high access efficiency), but a synchronous DRAM such as a Rambus DRAM in which a column address is changed in a sequential manner with a internal counter is preferable since a still higher speed access is realized.

With the above aspect of the present invention, since a sequential access is performed to a RAM in a time slot, an access efficiency to a RAM can be prevented from being reduced with an access right frequently changing.

Further, since time slots can be determined while assuming the worst case in which access to an RAM is the severest, design of a device for decoding a moving picture is easy to be effected.

Other aspects, objects, and the advantages of the present invention will become apparent from the following detailed description taken in connection with the accompanying drawings.

BRIEF DESCRIPTION OF THE DRAWINGS

FIG. 8 is an illustration showing an assignment of a time slot sequence in one frame period;

DESCRIPTION OF THE PREFERRED EMBODIMENTS

Figure 1:
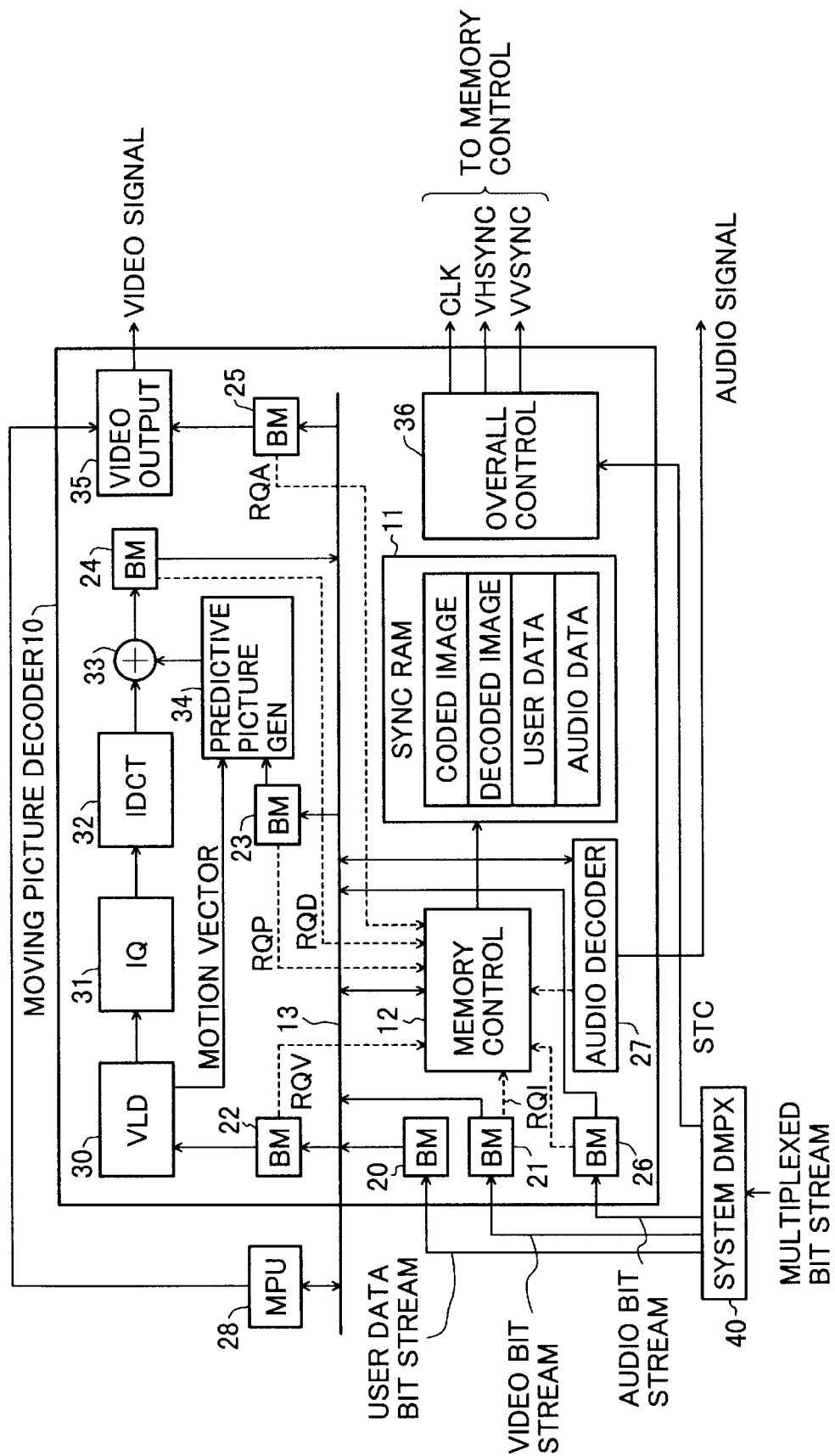
FIG. 1 is a schematic block diagram showing a structure of a device for decoding a moving picture and a system demultiplexing part of a first embodiment in accordance with the present invention.

Referring now to the drawings, wherein like reference characters designate like or corresponding parts throughout several views, preferred embodiments of the present invention are described below.

It should be noted that the use of the terms "connected" and "coupled" indicates an electrical connection between two elements and can include an intervening element between the two "coupled" or "connected" elements.

First Embodiment

FIG. 1 shows a schematic structure of a device 10 for decoding a moving picture and a system demultiplexing part of the first embodiment in accordance with the present invention.

In a synchronous RAM 11, storage areas for coded image data, decoded image data, user data and audio data are assigned. The synchronous DRAM 11 is, for example, a Rambus DRAM and a high-speed access is made possible after first access of data by providing a request packet thereto. The synchronous DRAM 11 is connected to a memory bus 13 by way of a memory control part 12. In order to secure a high speed of the synchronous RAM 11, buffer memory parts 20 to 26 are connected to the memory bus 13. Access requests from the buffer memory parts 21 through 25 to the synchronous RAM 11 are arbitrated by a memory control section 12. The buffer memory parts 21 to 25 respectively provide a write request signal RQI, read request signals RQV and RQP, a write request signal RQD and a read request signal RQA to the memory control part 12. An audio decoding part 27 and an MPU 28 are further connected to the memory bus 13.

A variable length decoding part 30, an inverse quantization part 31, an inverse DCT part 32 and an adder 33 are cascaded between the buffer memory parts 22 and 24 in this order. Coded image data from the buffer memory 22 are provided to the variable length decoding part 30 and decoded image data from the adder 33 are stored into the buffer memory part 24. A predictive picture generation part 34 is connected between the buffer memory part 23 and the adder 33. The predictive picture generation part 34 receives information such as a motion vector and a macroblock address increment which are separated in the variable length decoding part 30 and notifies the buffer memory 23 of a reference picture read-start-address which is determined by the macroblock address and the motion vector, and the buffer memory 23 reads a reference image data from that address. Decoded image data are provided to a video output part 35 from the buffer memory part 25, and data which are obtained by graphic conversion of user data which are character information are provided to the video output part 35 from the MPU 28.

Processing of each macroblock (16×16 pixels) as a unit is performed in the variable length decoding part 30, the inverse quantization part 31 and the predictive picture generation part 34 according to the MPEG standard, and processing of each block (8×8 pixels) as a unit is performed in the inverse DCT part 32. In the buffer memory part 24, either 6 time repetition of each block processing on one macroblock or one time processing of each macroblock may be employed.

Overall control of the device 10 for decoding a moving picture is performed by an overall control part 36.

In the first embodiment, in order to avoid reduction in access efficiency of the synchronous RAM 11 due to frequent change-overs among access rights to the synchronous RAM 11, time slot control is effected on access requests from the buffer memory parts 21 to 25. Time slots for access for the respective buffer memory parts 21 to 25 are determined in advance as described later while assuming the worst case in which access to the synchronous RAM 11 is the severest. A user data volume is excluded from an object for time slot control to increase a memory access efficiency since the worst case is not defined in MPEG standard.

Figure 2:
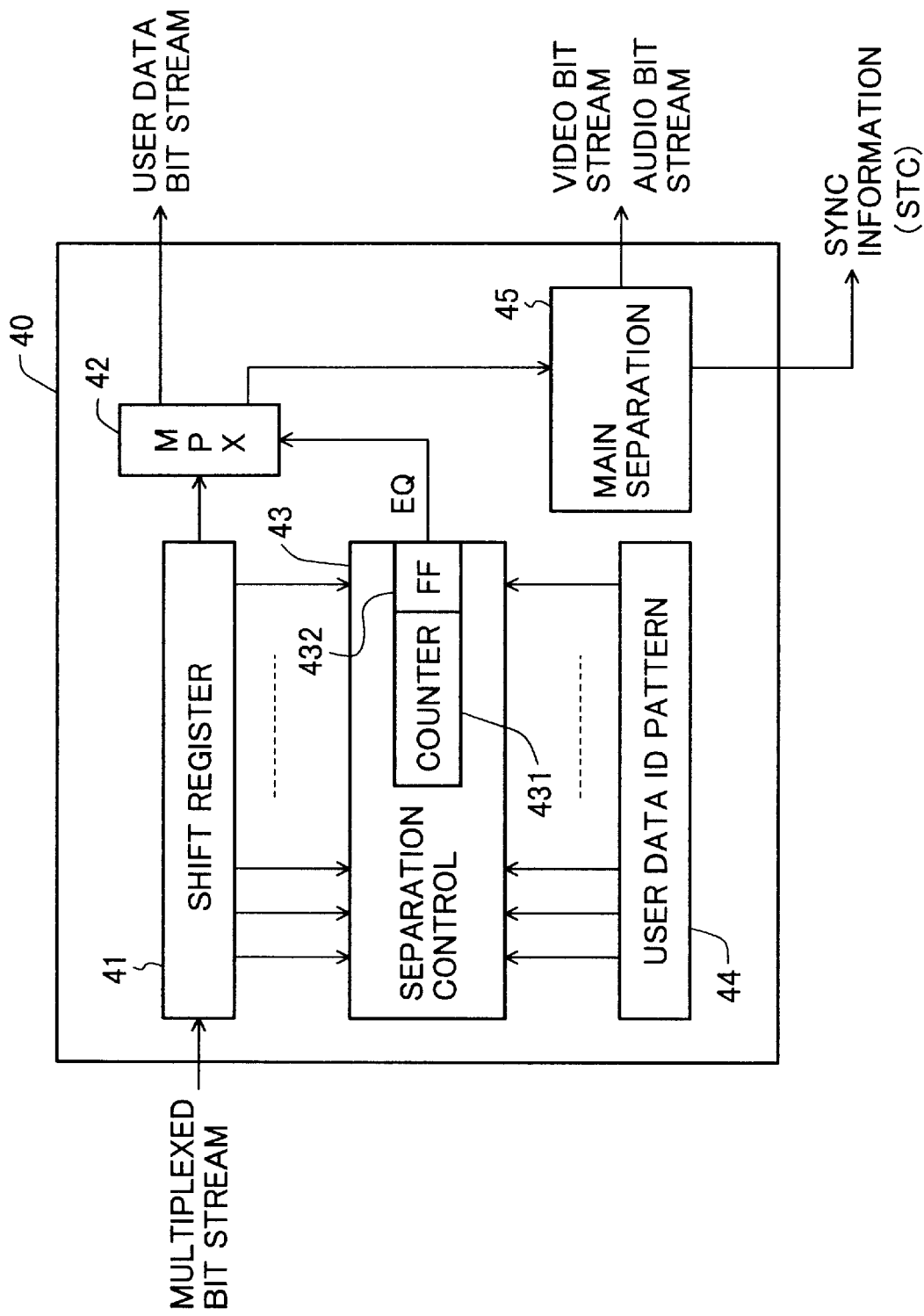
FIG. 2 is a block diagram showing an example of the system demultiplexing part in FIG. 1.

An example of the system demultiplexing part 40 is shown in FIG. 2.

A multiplexed bit stream of the MPEG system is a packetized stream in which a coded video bit stream, a coded audio bit stream and a coded user data bit stream are multiplexed. A packet header includes information such as a system clock reference SCR, a stream ID, a presentation time stamp PTS.

The multiplexed bit stream is provided by way of a shift register 41 to a multiplexer 42. A parallel output of the shift register 41 is compared with a user data identification pattern 44 by a separation control circuit 43 and an coincide signal EQ is provided to a control input of the multiplexer 42 from the separation control circuit 43. The number of bits of the shift register 41 is, for example, a total bit number of a series of a 'packet start code,' a 'stream ID' and a 'packet length.' A packet start code and a stream ID of user data are provided from the user data identification pattern 44. The separation control circuit 43 comprises a comparator (not shown), a user data finish judgment counter 431 and a flip-flop 432 which outputs a coincide signal EQ.

The separation control circuit 43 loads the packet length to the counter 431 and activates the coincide signal EQ with setting the flip-flop 432 when the separation control circuit 43 detects with a comparator that a stream ID which comes next to the packet start code indicates user data. With this, the output of the multiplexer 42 is changed over to the buffer memory 20 side of FIG. 1. A count of the counter 431 is decremented by a clock. When the count becomes 0, the flip-flop 432 is reset and the coincide signal EQ is deactivated. Thereby, output of the multiplexer 42 is changed over to the main separation part 45 side. The main separation part 45 separates synchronization information such as a system time clock STC from an input bit stream and provides the overall control part 36 of FIG. 1 with the information. Further, the main separation part 45 separates the input bit stream into a video bit stream and an audio bit stream on the basis of the stream ID, and provides them to the buffer memories 21 and 26 of FIG. 1, respectively.

Figure 3:
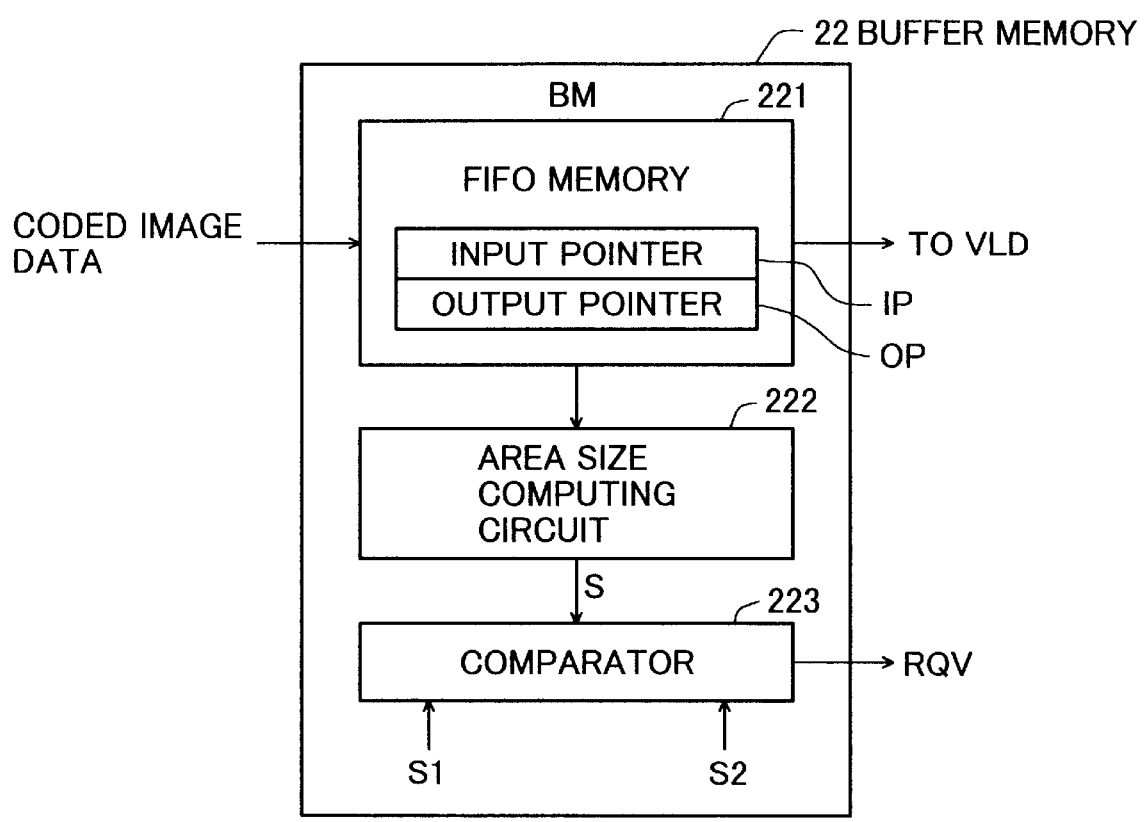
FIG. 3 is a block diagram showing an example of a buffer memory part in FIG. 1.

FIG. 3 shows an example of the buffer memory part 22.

Figure 4:
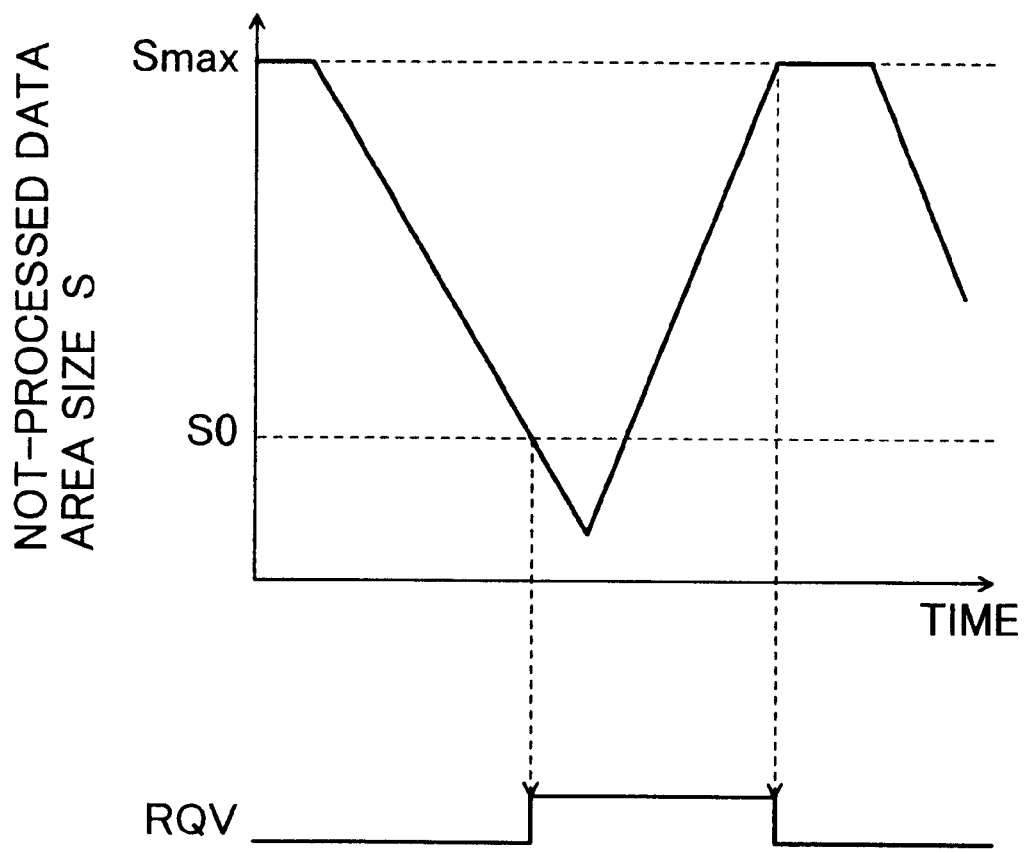
FIG. 4 are time charts showing operation of the buffer memory part of FIG. 3.

A FIFO memory 221 is a two port RAM provided with input and output ports and has an input pointer IP and an output pointer OP to store a write address and a read address for a next operation. An area size computing circuit 222 computes a not-processed data area size S based on values of the output pointer OP and input pointer IP and provides the comparator 223 with the area size S. The comparator 223 is of an output holding type and compares the area size S with a set value SO and, for example as shown in FIG. 4, when the comparator 223 detects that the area size S is reduced to be S=SO, the comparator 223 makes an output RQV high and hold it. In this state, the comparator 223 compares the area size S with a set value (capacity) Smax and when S=Smax, the comparator 223 resets the output read request signal RQV low.

Control by the memory control part 12 is simplified by generating such a read request signal RQV in the buffer memory part 22.

Each of the buffer memory parts 21 and 23 to 25 have a similar structure to the buffer memory part 22 except for a set value SO and a capacity Smax.

In FIG. 1, the overall control part 36 generates a continuous system clock CLK based on a non-continuous system time clock STC, further generates an imaginary horizontal synchronizing signal VHSYNC (in decoding processing, since the VHSYNC has no relation with a horizontal synchronizing signal of display, the term "imaginary" precedes "horizontal synchronizing signal") by frequency division of the system clock CLK, still further generates an imaginary vertical synchronizing signal VHSYNC by frequency division of the imaginary horizontal synchronizing signal VHSYNC and provides the memory control part 12 with the resulted signals for generation of time slots.

Figure 5:
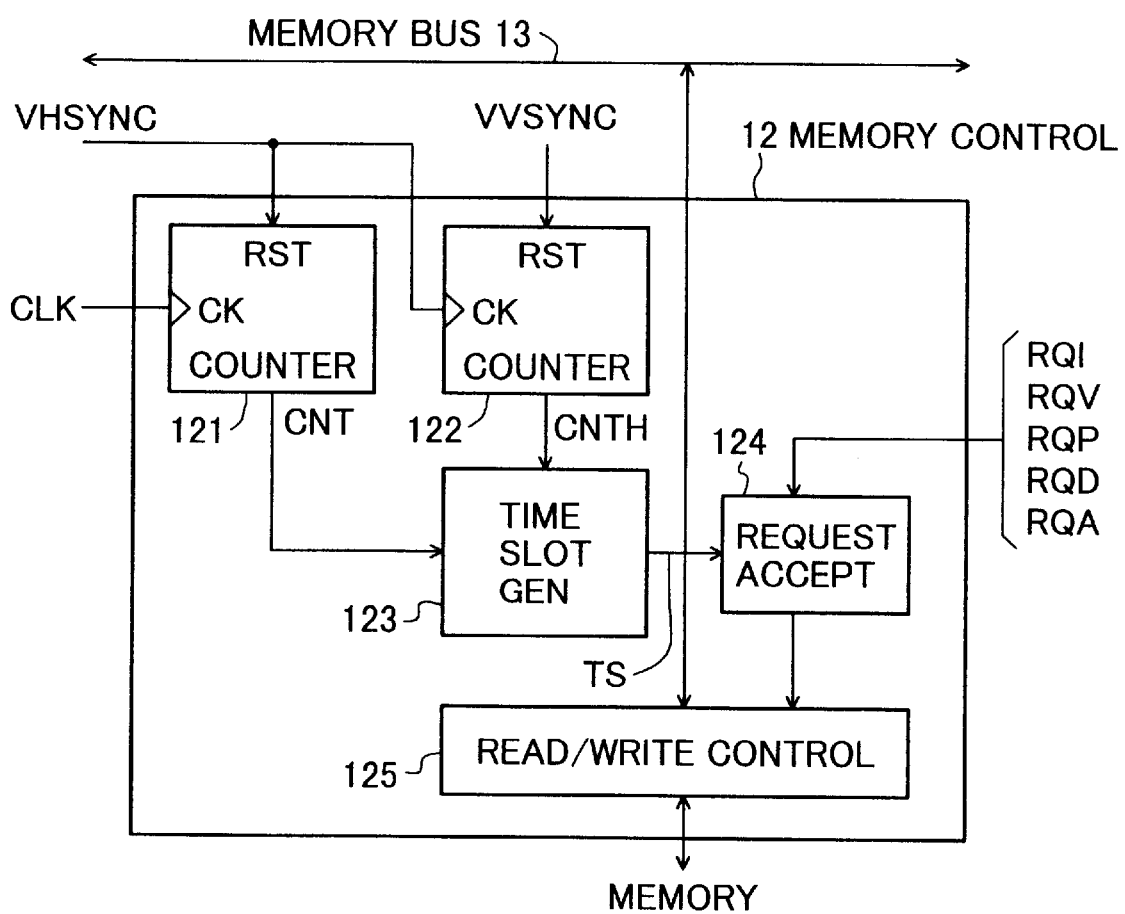
FIG. 5 is a block diagram showing an example of a memory control part in FIG. 1.

FIG. 5 shows an example of the memory control part 12.

The system clock CLK and the imaginary horizontal synchronizing signal VHSYNC are respectively provided to clock input CK of counters 121 and 122 and pulses thereof are counted. The imaginary horizontal synchronizing signal VHSYNC and the imaginary vertical synchronizing signal VVSYNC are respectively provided to reset input RST of the counters 121 and 122, and counts of the counters 121 and 122 are cleared to zero by the pulses thereof. Counts CNT and CNTH of the counters 121 and 122 are provided to a time slot generation part 123.

A time slot is determined by the time slot generation part 123 in the following manner.

Decoding processing of one frame is required to be performed in one frame period, for example, 1/30 sec. There are normally 720 pixels along a horizontal direction and in this case, the number of macroblocks to be processed in an imaginary horizontal scanning time (1 H) is equal to or more than 720/(16×16)=2.8. Therefore, in this first embodiment, the device 10 for decoding a moving picture is designed so that data of 3 macroblocks can be processed in 1 H.

Figure 6:
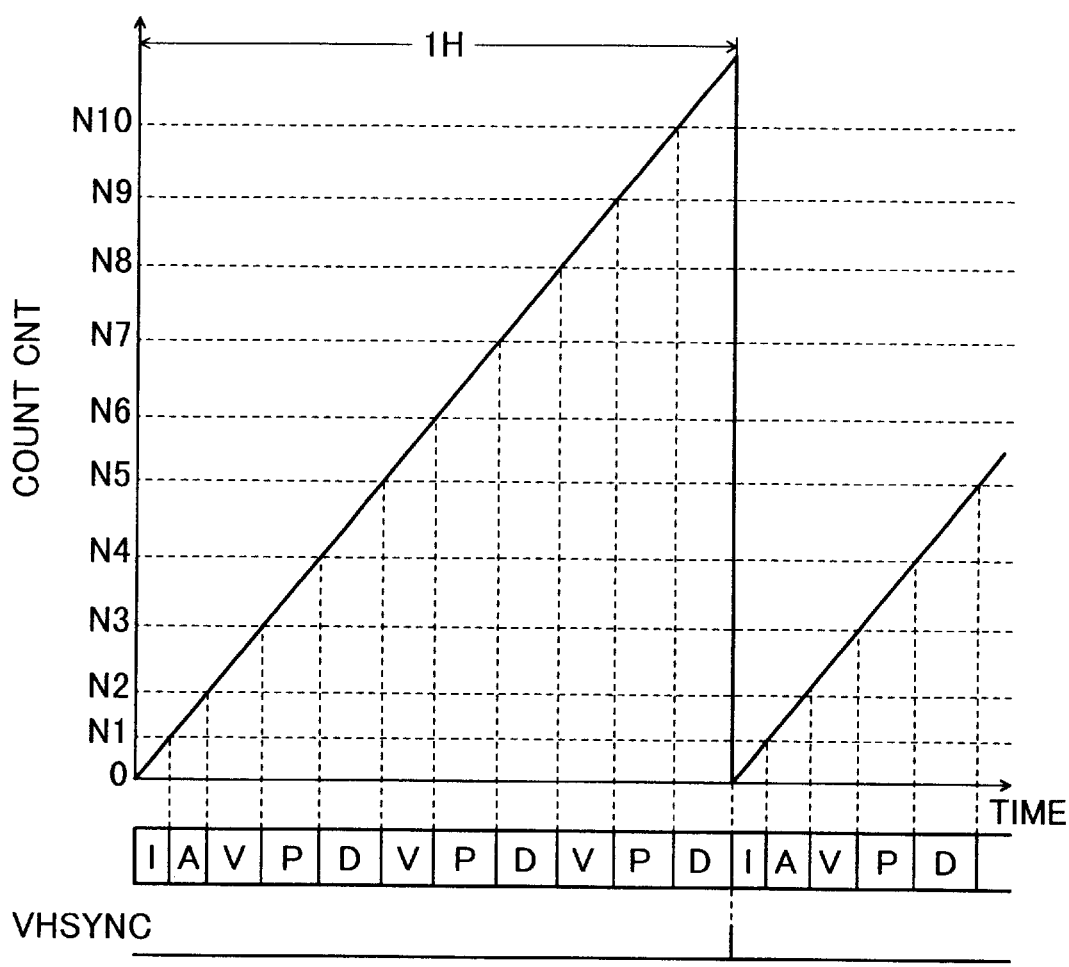
FIG. 6 are time charts showing operation of a circuit of FIG. 5.

FIG. 6 shows a relation between a count CNT and segmentation of a time slot. The time slot generation part 123 detects each count CNT of 0 and N1 through N10 to determine segmentation of a time slot. In FIG. 6, I and D respectively are time slots which are assigned in order to transfer data to the synchronous RAM 11 from the buffer memory parts 21 and 24 of FIG. 1 and V, P and A are time slots which are assigned in order to transfer data to the buffer memory parts 22, 23 and 25 from the synchronous RAM 11 of FIG. 1.

Figures 7A, 7B, 7C:
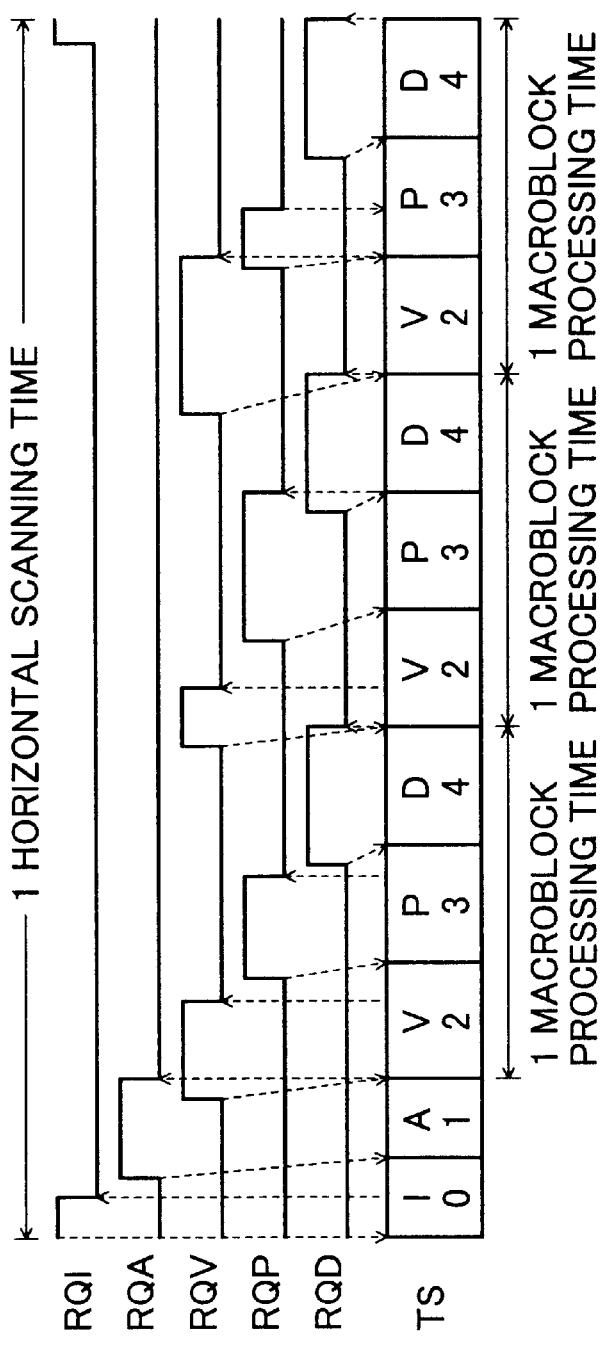
FIG. 7(A) are time charts showing operation of the circuit of FIG. 5, FIGS. 7(B) and 7(C) are illustrations showing time slot sequences different from that of FIG. 7(A) according to a position of an imaginary horizontal scanning period in one frame period.

The time slot generation part 123, in 1 H as shown in FIG. 7(A), generates time slots I and A and further repeatedly generates a time slot group consisting of time slots V, P and D 3 times.

When one frame is 720×480 pixels, namely (720/16)×(480/16)=45×30 macroblocks, decoding processing of one picture can be performed in 45×30/3=450 H. Accordingly, 30 H is in excess in one frame period in decoding processing. Therefore, as shown in FIG. 8, a surplus period of 226 to 239 in count CNTH is inserted after a top field decoding period of 1 to 225 in count CNTH and a surplus period of 489 to 502 in count CNTH is inserted after a bottom field decoding period of 263 to 287 in count CNTH. In the surplus periods, it is only required to generate time slots I and A. In corresponding to the top field and the bottom field, vertical blanking periods of 240 to 262 and 503 to 525 are respectively provided. In the vertical blanking periods, it is only required to generate s a time slot I.

According to a value of the count CNTH, the time slot generation part 123 generates a time slot sequence of FIG. 7(A) in each 1 H of the decoding period according to a value of the count CNTH, generates a time slot sequence of FIG. 7(B) in each 1 H of the surplus period and generates a time slot of FIG. 7(C) in each 1 H of the vertical blanking period.

Since a transfer rate in transfer of a video bit stream to the buffer memory part 21 is constant, a capacity required for the buffer memory part 21 can be as small as possible by generating one time slot I in each 1 H even in a vertical blanking period.

The time slot generation part 123 let time slots, for example as shown in FIGS. 7(A) to 7(C), I, A, V, P, D and no time slot correspond to time slot values TS=0 to 5, respectively, and provides a time slot value TS to a request accepting part 124.

The request accepting part 124 accepts a write request signal RQI if it is high when the time slot value TS has changed to 0, accepts a read request signal RQA if it is high when the time slot TS has changed to 1, accepts a read request signal RQV if it is high when the time slot value TS has changed to 2, accepts a read request signal RQP if it is high when the time slot value TS has changed to 3 and accepts a write request signal RQD if it is high when the time slot value TS has changed to 4. The request signals which have been accepted are provided to a read/write control part 125.

The read/write control part 125 responds to the request signals and meets the requests by accessing the synchronous RAM 11 until the request signals go low or the time slot ends. FIG. 7(A) shows a relation between time slot values TS and the request signals. The relation applies to the time slot sequences of FIGS. 7(B) and 7(C).

Processing other than image data processing is performed when the time slot value has changed and a corresponding request signal is low at that time and when TS=5 in FIGS. 7(B) and 7(C). That is, bus rights are given to the buffer memory parts 20, 26, the audio decoding part 27, or the MPU 28. Even if in such a manner, processing times for audio data and user data are sufficiently secured since the data are small in volume compared to a image data volume.

Then, operation of the device 10 for decoding a moving picture will be described with reference to FIG. 7(A).

A video bit stream is stored in the buffer memory part 21 and a write request signal RQI transits high. A time slot I is generated by the time slot generation part 123, a write request signal RQI is accepted by the request accepting part 124 and data of the buffer memory part 21 is transferred to the coded image data area of the synchronous RAM 11 by the read/write control part 125.

Decoded image data stored in the buffer memory 25 is read out in the video output part 35 which generates a video signal VS after performing such as format conversion, color conversion and digital to analogue conversion. According to circumstances, user data (character data) such as contents of a program and a superposed dialogue are subjected to graphic conversion and the resulted data are provided to the video output part 35 from the MPU 28 and superposed with image data from the buffer memory part 25.

A read request signal RQA transits high, a time slot A is generated by the time slot generation part 123, the read request signal RQA is accepted by the request accepting part 124 and one line volume of data of the video decoding area of the synchronous RAM 11 is transferred to the buffer memory part 25 by the read/write control part 125.

Data of one macroblock stored in the buffer memory part 22 are read out by the variable length decoding part 30 and information such as a motion vector are separated to be provided to the predictive picture generation part 34 and then coded data are converted to a quantization DCT coefficient. The predictive picture generation part 34 provides the buffer memory 23 with the reference picture read address. The read request signal RQV transits high according to reduction of data storage of the buffer memory part 22. A time slot V is generated by the time slot generation part 123, the read request signal RQV is accepted by the request accepting part 124 and data in the coded image data area of the synchronous RAM 11 are transferred to the buffer memory part 22 by the read/write control part 125.

Output of the variable length decoding part 30 is converted to a DCT coefficient by the inverse quantization part 31 and then converted to data of a space area by the inverse DCT part 32. If an output of the inverse DCT part 32 is an I-picture (intra coded picture), an output of the predictive picture generation part 34 is 0 and if an output of the inverse DCT part 32 is P-picture (predictive coded picture) or B-picture (bi-directional predictive coded picture), the predictive picture generation part 34 reads out a reference picture from the buffer memory part 23 and a predictive picture is generated to be provided to the adder 33.

A read request signal transits high according to reduction in data storage of the buffer memory part 23. A time slot P is generated by the time slot generation part 123, a read request RQP is accepted by the request accepting part 124 and data of the decoded image data area of the synchronous RAM 11 is transferred to the buffer memory part 23 by the read/write control part 125.

One macroblock data of a computation result of the adder 33 is stored in the buffer memory part 24 as decoded image data. The write request signal RQD transits high according to increase in data storage of the buffer memory part 24. A time slot D is generated by the time slot generation part 123, the write request signal RQD is accepted by the request accepting part 124 and data of the memory buffer part 24 is transferred to the video decoded area of the synchronous RAM 11 by the read/write control part 125.

In such a manner, coded data of one macroblock are decoded in a period of one time slot group (one macroblock processing time). This processing is repeated 3 times in 1 H.

Next, determining methods for a time slot width, the maximum data transfer volume per time slot and a storage capacity of a buffer memory part will be described.

Data volume in one macroblock is different according to a processing part and a time required to process the data of this volume is different according to the processing part. In addition, a data transfer time between a buffer memory part and the synchronous RAM 11 is dependent on an access speed of the synchronous RAM 11.

In FIG. 1, although data volume of one picture to the buffer memory part 21 from the system demultiplexing part 40 is largely changed by a compression factor, a data transfer rate is constant, for example at 6 Mbps, in transmission. Based on this data transfer rate, the maximum data volume required for transfer to the synchronous RAM 11 from the buffer memory part 21 for each 1 H, a time slot width and a capacity of the buffer memory part 21 are determined.

Although a data transfer volume per one macroblock to the buffer memory part 22 from the synchronous RAM 11 is different according to a coded data compression factor, the value is determined taking the worst case into consideration as described below.

(1) Determining Method 1

The worst case of a data transfer volume to the variable length decoding part 30 from the buffer memory part 22 is as follows according to the MPEG standard.

The number of macroblocks of the maximum 9,216 bits in one macroblock line (to be exact, 9,216 bits is the number of bits of a DCT coefficient, in addition there are control information such as a motion vector and a macro block address, so the maximum number of bits of one macroblock is larger than this by some) is two at largest, and all macroblocks in the rest are 4,608 bits at maximum. When one block line includes 45 macroblocks, the worst case of a memory transfer volume in one macroblock line is $$9{,}126 \text{ bits} \times 2 + 4{,}608 \text{ bits} \times 43 = 216{,}576 \text{ bits}.$$

Accordingly, the average bit number per one macroblock in this case is $219{,}576/45 \approx 4{,}813$ bits.

In the worst case of two macroblock line, each of the last two macroblocks of the first one macroblock line is 9,216 bits, each of the first two macroblocks of the next macroblock line is 9,216 bits and the following one macroblock is 4,608 bits.

In this case, if the variable length decoding part 30 transfers 4,183 bits to the buffer memory part 22 through the memory control part 12 from the synchronous RAM 11 each time when the variable length decoding part 30 processes data of one macroblock, a necessary capacity of the buffer memory part 22 for the variable length decoding part 30 not to skip processing in an assigned time slot V is $$9{,}216 \text{ bits} \times 4 - 4{,}813 \text{ bits} \times 3 = 22{,}425 \text{ bits}.$$

If the variable length decoding part 30 processes 3 macroblocks (=9,126 bits×3 times) in 3 macroblock processing period in the worst case and supplements the buffer memory part 22 with 4,813 bits×3 times during the processing time, data of $$22{,}425 - 9{,}216 \times 3 + 4{,}813 \times 3 = 9{,}216 \text{ bits}$$

remain in the buffer memory part 22 at the start of a next macroblock processing period. The variable length decoding part 30 processes 9,216 bits in the next one macroblock processing period and the buffer memory part 22 is supplemented with 4,813 bits. Therefore, the variable length decoding part 30 can process 4,608 bits in a still next macroblock processing period, and thereby the worst case can be dealt with.

(2) Determining Method 2

If the buffer memory part 22 is supplemented with 9,216 bits in one time slot by widening a time slot width or using a RAM 11 with a high access speed, a necessary capacity of the buffer memory part 22 is 9,216 bits, which is smaller than in the above case.

(3) Determining Method 3

Further, according to the MPEG standard, the maximum number of bits per one picture is 1.75 Mb. When one picture is 675 macroblocks, the average number of bits per one macroblock is 1.75 Mb/675≈2,719 bits. Therefore, it can be allowed that the buffer memory part 22 is supplemented with 2,719 in one time slot. In this case, a necessary storage capacity of the buffer memory part 22 is clearly larger than in the case of (1).

As in the methods (1) to (3), as a data volume transferred to the buffer memory 22 from the synchronous RAM 11 in one time slot is smaller while the data volume transferred is uniform, a necessary storage capacity of the buffer memory part 22 is larger.

Since a data volume transferred to the predictive picture generation part 34 from the buffer memory part 23 per one macro block becomes the worst case in a bi-directional prediction. Based on this case, the capacity of the buffer memory is determined.

A data transfer rate when a video bit stream is provided to the buffer memory part 21 is a predetermined value and a data transfer rate from the buffer memory part 25 to the video output part 35 is a predetermined value. Based on this case, the storage capacities thereof are determined.

For example, when the MPU 28 converts user data (character data) in the RAM 11 to graphic data, write it in the RAM 11 and further reads out the data to provide to the video output part 35 as superposing data, or when a display screen is divided into two halves and two programs are displayed, a data access volume per one time slot to the RAM 11 is smaller and a capacity of the buffer memory part is required to be larger since the number of accesses to the RAM 11 is increased. In the other cases, it is preferred that a data access volume per one time slot to the RAM 11 is made larger and a capacity of the buffer memory part is made small, thereby reducing a fabrication cost.

Note that when a surplus period is still secured even if other processing is performed in the surplus period and the vertical blanking period, it may be allowed that a capacity of buffer memory is made smaller than the above described case, and when data of one macroblock is not existent in the buffer memory, it may be allowed that processing is skipped in processing part and thereby processing time is shifted and the processing is executed in the surplus period as well.

Second Embodiment

Figure 9:
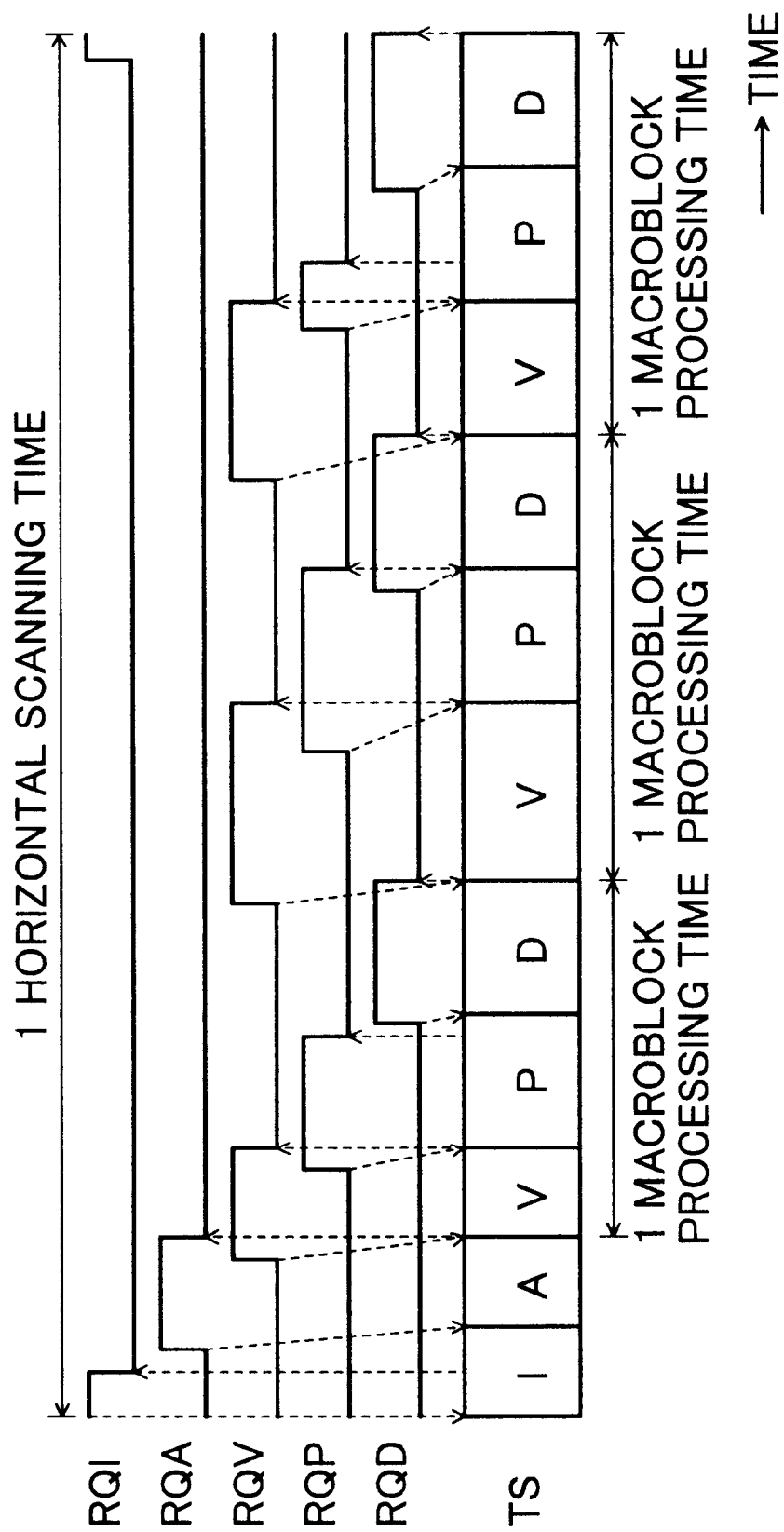
FIG. 9 are time charts showing a time slot sequence and access request signals of a second embodiment in accordance with the present invention, corresponding to FIG. 7(A)

FIG. 9 shows a time slot and access request signals of the second embodiment in accordance with the present invention, corresponding to FIG. 7(A).

A data volume of one macroblock to the buffer memory part 22 is different according to a compression factor. Therefore, in this embodiment, in FIG. 5, a read request signal RQV provided to the request accepting part 124 is provided to the time slot generation part 123 as well. The time slot generation part 123 makes a time slot width of only a time slot V variable by only finishing the time slot V when the read request signal RQV goes low.

Thereby, since a data volume which can be accessible in a burst mode to the same raw in a cell array of the synchronous RAM 11 is larger, an access efficiency to the synchronous RAM 11 is improved.

Third Embodiment

Figure 10:
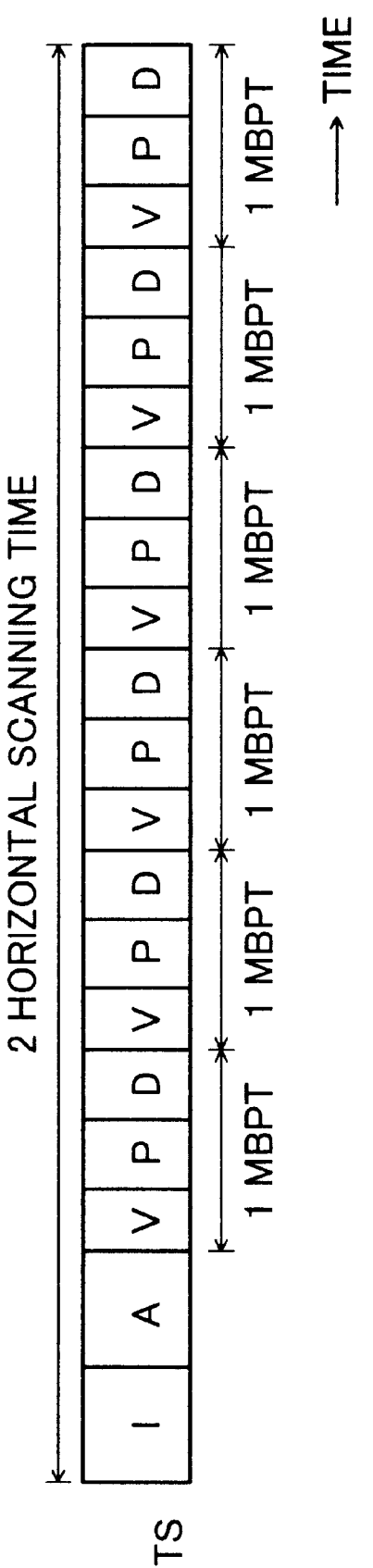
FIG. 10 is an illustration showing a time slot sequence of a third embodiment in accordance with the present invention, corresponding to FIG. 7(A)

FIG. 10 is an illustration showing a time slot sequence of a third embodiment in accordance with the present invention, corresponding to FIG. 7(A).

In this embodiment, a time slot group consisting of time slots V, P and D is repeatedly generated in 6 times which is twice as many as in the case of FIG. 7(A).

Thereby, since in time slots I and A it is possible to get access of a larger data volume sequentially to the same raw in the cell array of the synchronous RAM 11, an access efficiency is improved.

Fourth Embodiment

Figure 11:
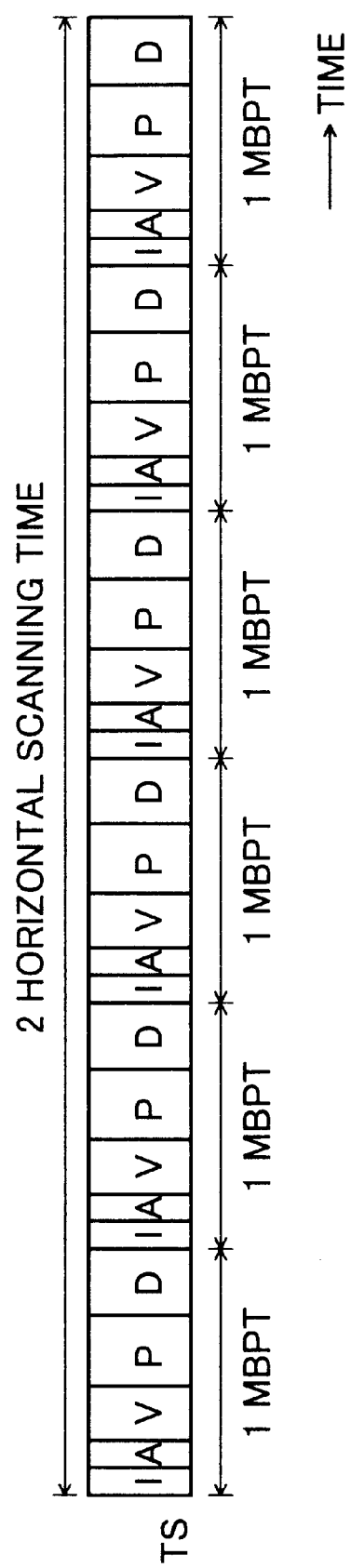
FIG. 11 is an illustration showing a time slot sequence of a fourth embodiment in accordance with the present invention, corresponding to FIG. 10.

FIG. 11 is an illustration showing a time slot sequence of the fourth embodiment in accordance with the present invention, corresponding to FIG. 10.

In this embodiment, time slots I and A are included in each time slot group of time slots V, P and D and thereby, cycle time of the time slots I and A are made equal to one macroblock processing period.

Thereby, necessary capacities of the buffer memory parts 21 and 25 can be decreased.

In FIG. 11, although time slots are shown in two horizontal scanning periods in relation to FIG. 10, since one horizontal scanning period is just equal to 3 macroblock processing period, a time slot sequence is the same as the case where time slots are assigned on one horizontal scanning period.

Fifth Embodiment

Figure 12:
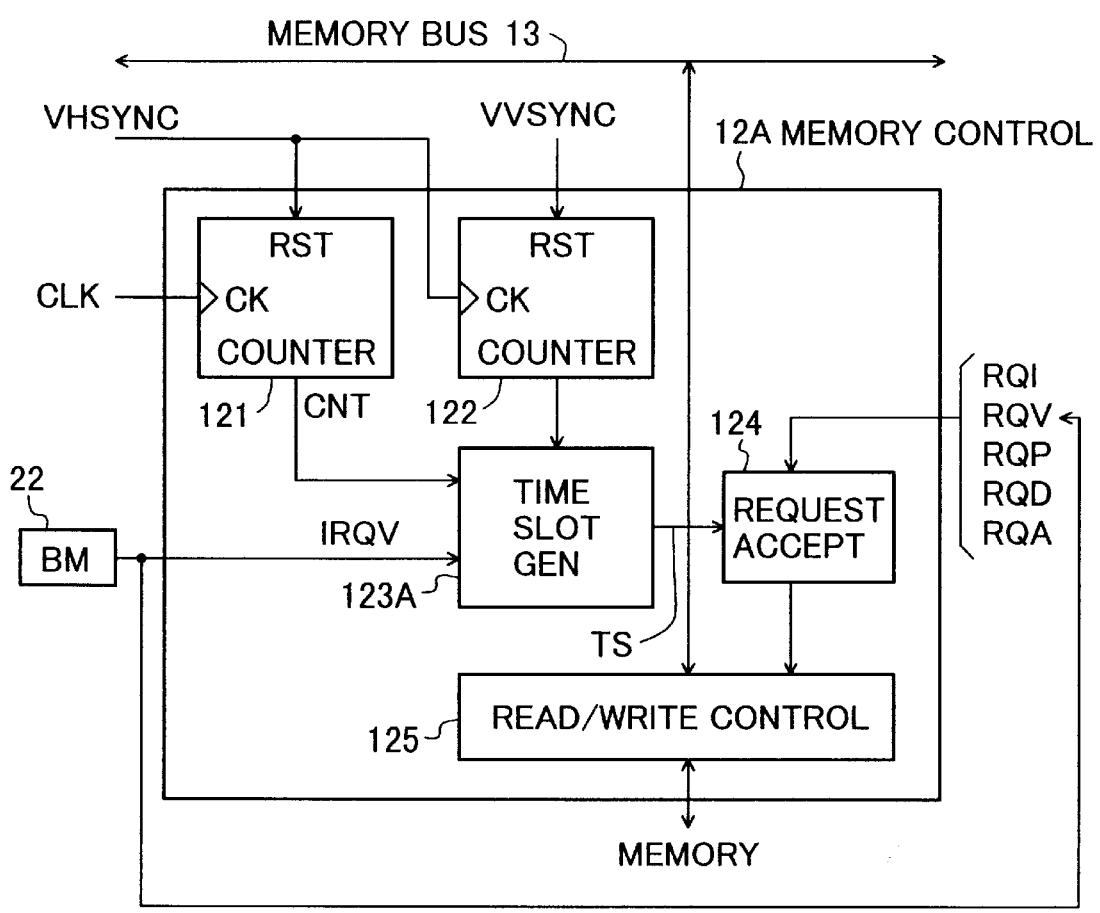
FIG. 12 is a block diagram showing a memory control part of a fifth embodiment in accordance with the present invention.

FIG. 12 shows a memory control part 12A of the fifth embodiment in accordance with the present invention.

In the circuit, a read request signal RQV to the request accepting part 124 from the buffer memory part 22 is also provided to a time slot generation part 123A as an interrupt request signal IRQV.

Figure 13:
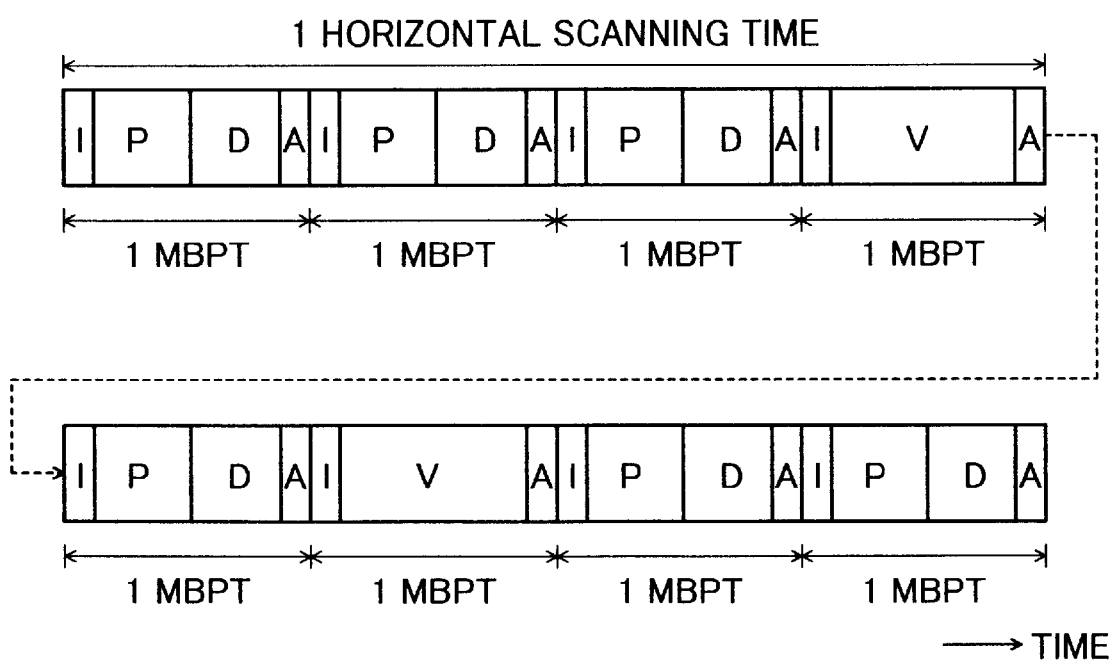
FIG. 13 is an illustration showing a time slot sequence of the, fifth embodiment in accordance with the present invention, corresponding to FIG. 11.

The time slot generation part 123A basically excludes a time slot V from a time slot group as shown in FIG. 13. Only in the case where an interrupt request signal IRQV is activated, exception occurs that generation of a time slot group in which a time slot V is assigned instead of time slots P and D gets started when the present time slot has finished. This time slot group has a one macroblock processing period equal to the others, and time slots I and A are respectively assigned on both sides of a time slot V. Thereby cycle times of the time slots I and A are kept constant regardless of the interruption, resulting in reducing in capacity of the buffer memory parts 21 and 26.

Although preferred embodiments of the present invention has been described, it is to be understood that the invention is not limited thereto and that various changes and modifications may be made without departing from the spirit and scope of the invention.

For example, without employing the counter 122 of FIG. 5, upper bits of the counter 121 may be employed instead of the output of the counter 122.

Further, without providing request signal to the memory control part 12 from the buffer memory parts 21 through 25, access to the buffer memory part corresponding to a time slot may be executed.

An asynchronous RAM, in which a raw address is designated as in a page mode and a column address is sequentially changed and thereby, an access efficiency is higher than in random access, may be employed instead of the synchronous RAM 11. The RAM 11 may be an SRAM.

What is claimed is:

1. A device decoding a moving picture comprising:
 a plurality of buffer memory parts, connected between a plurality of respective processing parts including at least one decoding part and a memory bus, each buffer memory part outputting a read request signal or a write request signal based upon use thereof; and a memory control part controlling access between the corresponding buffer memory parts and a memory via said memory bus and assigning time slots to respective ones of said buffer memory parts cyclically in response to said read or write request signals to control access to the memory in each time slot, wherein said memory control part assigns the time slots to one of said plurality of buffer memory parts corresponding to said decoding part to provide coded image data to said decoding part in response to a corresponding one of said read request signals.

2. A device for decoding a moving picture according to claim 1, wherein the respective processing parts comprise:
  a system demultiplexing part for separating a multiplex bit stream into a plurality of bit streams;
  a variable length decoding part, an inverse quantization part, and an inverse DCT part being cascaded in this order;
  a predictive picture generation part;
  an adder coupled to receive outputs of said inverse DCT part and said predictive picture generation part; and a video output part for generating a video signal based on a decoded image data,
  wherein said buffer memory parts comprise:
    a first buffer memory connected between an output of said system demultiplexing part and said memory bus;
    a second buffer memory part connected between an input of said variable length decoding part and said memory bus;
    a third buffer memory part connected between an input of said predictive picture generation part and said memory bus;
    a fourth buffer memory part connected between an output of said adder and said memory bus; and
    a fifth buffer memory part connected between an input of said video output part and said memory bus.

3. A device for decoding a moving picture according to claim 2, wherein said memory control part comprises:
  a counter for counting a clock with a count of said counter changing cyclically;
  a time slot generation part for generating said time slots based on said count; and
  a read/write control part for controlling, in each time slot generated, access between said corresponding buffer memory part and said memory.

4. A device for decoding a moving picture according to claim 3, wherein said time slot generation part repeatedly generates a time slot group each of which includes ones of said time slots for said second, third and fourth buffer memory parts.

5. A device for decoding a moving picture according to claim 4, wherein said time slot generation part further generates at least one time slot for each of said first and fifth buffer memory parts in a period N times as long as one horizontal scanning period, where N being an integer.

6. A device for decoding a moving picture according to claim 4, wherein said time slot generation part controls a time slot width for each of said third and fourth buffer memory parts to be constant and controls a time slot ending point for said second buffer memory part to be a time point when a free area of said second buffer memory part has become not existent by data storage into said second buffer memory.

7. A device for decoding a moving picture according to claim 4, wherein said time slot generation part generates said time slot groups of [k×(the number of pixels on one horizontal scanning line)/256] in number, in an imaginary k horizontal scanning period, where [ ] denotes the integer portion of a value in the parentheses.

8. A device for decoding a moving picture according to claim 4, wherein said memory control part controls a decoding processing period to correspond to a picture display period based on said count of said counter, generates only at least one time slot for said first buffer memory part in an imaginary one horizontal scanning period, while generating no time slots for said second to fifth buffer memory parts, and controls access of data other than image data to said memory in a free time.

9. A device for decoding a moving picture according to claim 3, wherein said time slot generation part repeatedly generates a time slot group which includes said time slots for said first to fifth buffer memory parts.

10. A device for decoding a moving picture according to claim 9, wherein said second buffer memory part provides said memory control part with an interrupt request signal when a not-processed data volume is decreased to be a set value, and
  wherein said time slot generation part repeatedly generates a first time slot group having one of said time slots for said first and third to fifth buffer memory parts, and responds to said interrupt signal to generate a second time slot group having one of said time slots for said first, second and fifth buffer memory parts after said first time slot currently in service has finished.

11. A device for decoding a moving picture according to claim 10, wherein widths of said first and second time slot groups are equal to each other.

12. A device for decoding a moving picture according to claim 2, wherein said system demultiplexing part compares an input bit stream with a user data identification pattern to separate user data from said input bit stream and provides said first buffer memory part with said bit stream from which said user data have been separated.

13. A device for decoding a moving picture according to claim 2, wherein each of said first to fifth buffer memory parts comprises:
  a buffer memory provided with an input pointer and an output pointer respectively holding a write address and a read address;
  an area size computing circuit which computes a size of a not-processed data area or a free area in said buffer memory based on said write address and said read address; and
  a comparator circuit which generates each read request signal by comparing said size with a set value.

14. A device for decoding a moving picture according to claim 13, wherein said comparator circuit activates said read request signal during a time from when a not-processed area size is decreased to be equal to or less than a predetermined value to when said not-processed area size is increased to the maximum value.

15. A device for decoding a moving picture according to claim 14, wherein in one of said time slots, said memory control part controls access between said corresponding buffer memory part and said memory only when said read request signal corresponding to said time slot is activated.

16. A device for decoding a moving picture according to claim 15, wherein said memory control part controls, when at a start point of said time slot, said read request signal corresponding to said time slot is inactive, access of data other than image data to said memory.

17. A device for decoding a moving picture according to claim 2, wherein said second buffer memory part has at least the maximum storage capacity allowed in a standard for coded data of one macroblock, and wherein a width of said time slot for said second buffer memory part is at least a necessary time to read out and transfer data of the maximum volume from said RAM to said second buffer memory part.

18. A device for decoding a moving picture according to claim 2, wherein said second buffer memory part has at least a storage capacity of [(the maximum volume allowed in a standard of coded data in one macroblock)×(the number N of macroblocks with the maximum volume allowable included in one macroblock line)−A×(N−1)], where A=(the maximum volume allowed in said standard of coded data in one macroblock line)/(the number of macroblocks on one macroblock line), and wherein a width of said time slot for said second buffer memory part is at least a necessary time to read and transfer data of a quantity A from said memory to said second buffer memory.

19. A device for decoding a moving picture according to claim 1, wherein each buffer memory part comprises:

a storage section for storing data;

an computing section for computing a size of data stored in said storage section;

a comparison section for comparing said size computed by said computing section with a set value and generating said read request signal based upon a comparison result.

20. A device for decoding a moving picture according to claim 1, wherein one of the processing parts is a system demultiplexing part for separating a multiplex bit stream into a plurality of bit streams, wherein at least one of said buffer memory parts is connected to said system demultiplexing part.

21. The device for decoding a moving picture according to claim 1, wherein one of said plurality of buffer memory parts corresponds to a predictive picture generation part as one of the processing parts and provides the decoded image data to said predictive picture generation part in response to the corresponding one of said read request signals.

22. The device for decoding a moving picture according to claim 1, wherein one of said plurality of buffer memory parts corresponds to a video output part as one of the processing parts and provides decoded image data to said video output part in response to the corresponding one of said read request signals.

23. The device for decoding a moving picture according to claim 1, wherein one of said plurality of buffer memory parts corresponds to a system demultiplexing part as one the processing parts and provides coded image data to said memory in response to the corresponding one of said write request signals.

24. The device for decoding a moving picture according to claim 1, wherein one of said plurality of buffer memory parts corresponds to an adder part or an inverse DCT part as the processing parts and provides decoded image data to said memory in response to the corresponding one of said write request signals.

25. A method of decoding a moving picture, comprising:

providing buffer memory parts, connected between a plurality of respective processing parts including at least one decoding part and a memory bus, each buffer memory part outputting a read request signal or a write request signal based upon use thereof;

controlling access between the corresponding buffer memory parts and a memory via said memory bus by cyclically assigning time slots to respective ones of said buffer memory parts in response to said read or write request signals to control access to the memory in each time slot; and providing coded image data to said decoding part in response to a corresponding one of said read request signals, in the time slot assigned to one of said plurality of buffer memory parts corresponding said decoding part.

26. A method of decoding a moving picture according to claim 25, wherein said time slots are determined in consideration of the worst case in which access to said memory is the severest.

27. A method of decoding a moving picture according to claim 26, wherein said time slots are generated with placing a decoding processing period and a picture display period in a corresponding relation to each other.

28. A method of decoding a moving picture according to claim 27, wherein said time slot groups of k [(the number of pixels on one horizontal scanning line)/256] in number are generated in an imaginary k horizontal scanning period, where [ ] denotes the integer portion of a value in the parentheses.

* * * * *